(12) United States Patent
Bonte et al.

(10) Patent No.: US 9,119,347 B2
(45) Date of Patent: Sep. 1, 2015

(54) METHOD AND SYSTEM FOR DETERMINING THE LOAD ON AN ELEMENT OF THE DRIVE SYSTEM OF A PLUNGER IN A BALER

(71) Applicant: CNH Industrial America LLC, New Holland, PA (US)

(72) Inventors: Xavier G. J. M. Bonte, Et Sint Kruis (NL); Frederik Tallir, Esen (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/384,932

(22) PCT Filed: Mar. 14, 2013

(86) PCT No.: PCT/EP2013/055196
§ 371 (c)(1),
(2) Date: Sep. 12, 2014

(87) PCT Pub. No.: WO2013/135794
PCT Pub. Date: Sep. 19, 2013

(65) Prior Publication Data
US 2015/0027325 A1    Jan. 29, 2015

(30) Foreign Application Priority Data
Mar. 14, 2012    (BE) .................................. 2012/0169

(51) Int. Cl.
*A01F 15/04* (2006.01)
*A01F 15/08* (2006.01)
*B30B 9/30* (2006.01)

(52) U.S. Cl.
CPC ................. *A01F 15/04* (2013.01); *A01F 15/08* (2013.01); *A01F 15/0825* (2013.01); *A01F 15/0841* (2013.01); *B30B 9/3007* (2013.01)

(58) Field of Classification Search
CPC . A01F 15/0841; A01F 15/0825; A01F 15/08; A01F 15/04
USPC ................................ 100/4, 35, 43, 48, 50, 99
See application file for complete search history.

(56) References Cited

U.S. PATENT DOCUMENTS

| | | | |
|---|---|---|---|
| 4,692,857 A | 9/1987 | Chi | |
| 5,123,338 A | 6/1992 | Mathis | |
| 5,384,436 A * | 1/1995 | Pritchard | ...................... 177/136 |
| 6,101,932 A * | 8/2000 | Wilkens | .......................... 100/41 |
| 6,257,131 B1 * | 7/2001 | Wilkens et al. | .................. 100/43 |
| 6,474,228 B1 | 11/2002 | Leupe et al. | |
| 6,543,342 B2 * | 4/2003 | Leupe et al. | .................... 100/45 |
| 7,007,599 B2 | 3/2006 | Roth | |

* cited by examiner

*Primary Examiner* — Jimmy T Nguyen
(74) *Attorney, Agent, or Firm* — Patrick M. Sheldrake; Seyed V. Sharifi T.

(57) ABSTRACT

System and method of determining the load on an element of the drive system of a plunger of an agricultural baler, and to use thereof for controlling such balers. A value representative of an estimate of the load on an element of the drive system of the plunger is determined, based on combining an obtained value representative of the load on the plunger with obtained position information of the drive element relative to the plunger.

15 Claims, 5 Drawing Sheets

METHOD AND SYSTEM FOR DETERMINING THE LOAD ON AN ELEMENT OF THE DRIVE SYSTEM OF A PLUNGER IN A BALER

This application is the US National Stage filing of International Application Serial No. PCT/EP2013/055196 filed on Mar. 14, 2013 which claims priority to Belgian Application BE2012/0169 filed Mar. 14, 2012, each of which is incorporated herein by reference in its entirety.

FIELD OF THE INVENTION

The present invention relates to methods and systems used in balers for harvesting crop, more in particular to methods and systems for determining the load on an element of the drive system of a plunger in a baler and use of such methods and systems for controlling such balers.

BACKGROUND OF THE INVENTION

An agricultural baler is a trailed machine, typically towed behind an agricultural vehicle such as a tractor, used in agriculture for the purpose of forming bales of agricultural crop materials, such as straw, hay, silage or other biomass, produced during a harvesting or mowing operation. A baler typically comprises an infeed through which biomass is introduced into a bale-forming chamber. In the bale-forming chamber the biomass is generally compressed or otherwise treated to form bales. The completed bales are tied with twine or a similar lineal object or are packaged in another way to make them self-supporting. The bales are subsequently ejected by means of a discharge mechanism.

Referring to the drawings, FIG. 1 shows agricultural baler 600 comprising a frame 512 which is equipped with a forwardly extending tongue 514 at its front end with hitch means (not shown) for coupling the baler 600 to a towing tractor. A pick-up assembly 513 lifts windrowed crop material off the field as the baler 600 is travelled thereover and delivers such material into the front end of a rearward and upwardly curved, charge-forming feeder duct 515. The duct 515 communicates at its upper end with an overhead, fore-and-aft extending bale-forming chamber 516 into which crop charges are loaded by a cyclically operating stuffer mechanism 517. A continuously operating packer mechanism 519 at the lower front end of the feeder duct 515 continuously feeds and packs material into the duct 515 as to cause charges of the crop material to take on and assume the internal configuration of the duct 515 prior to periodic engagement by the stuffer 517 and insertion up into the bale-forming chamber 516. The feeder duct 515 may be equipped with means (not illustrated) for establishing whether a complete charge has been formed therein and operating the stuffer mechanism 517 in response thereto. Each action of the stuffer mechanism 517 introduces a "charge" or "flake" of crop material from the duct 515 into the chamber 516. A plunger 562 reciprocates in a fore-and-aft direction within the bale-forming chamber 516. Biomass fed via the feeder duct 515 is thereby compacted, e.g. compressed or otherwise treated, so as to form bales in the above-described operation of the agricultural baler 600. Rectangular bales are formed. The completed bales are tied with twine or a similar lineal object to make them self-supporting, for example for shipping and storage. Once tied, the bales are discharged from the rear end of the bale-forming chamber 516 onto a discharge in the form of a chute, generally designated 520.

The operation of such high density baler results in high loads on the elements of the baler such as the plunger, its drive elements or other elements, which might result in break-down or rapid ageing if the baler is not operated properly. While measuring by sensors and controlled operation based thereon is used in the art, e.g. on the baler chamber, it is known in the field that measuring of loads by load sensors and strain gauges, as for example presented in EP0655190, is expensive and/or requires a complex set-up with careful calibration because of the high loads involved. Furthermore, it has been noticed that, despite the load measurements in EP0655190, gear box shear bolts still break, indicating that unexpected large loads apply to the gear box.

SUMMARY OF THE INVENTION

It is an object of embodiments of the present invention to provide a safety system and method for protecting the gear box of an agricultural baler against overloads.

The above objective is accomplished by methods and systems according to embodiments of the present invention.

In a first aspect, the present invention provides an electronic device for determining a value representative of or an estimate of the load on one or more elements of a drive system of a baler for harvested crop. The drive system is used for driving the plunger of the baler for compressing the harvested crop into bales. The electronic device comprises a first port for obtaining, e.g. receiving, a first value representative of or an estimate of the load on the plunger; a second port for obtaining, e.g. receiving, a second value representative of or an estimate of the position of one or more elements of the drive system, relative to load on the plunger; and a computation unit for determining the value representative of or the estimate of the load on one or more elements of the drive system based on the first and second value. In determining the value representative of or the estimate of the load on one or more elements of the drive system, the first and second value may be combined, for example by mathematical combination such as multiplication. The electronic device according to embodiments of the present invention may furthermore comprise a third port for outputting the determined load value.

Such electronic device may in particular be used on a square baler. Hence the first aspect of the present invention also provides a square baler for forming rectangular bales of agricultural crop material. The square baler comprises a plunger for compacting harvested crop material by a reciprocating movement in a fore-and-aft direction within a bale-forming chamber, and a drive system for driving the reciprocating movement of the plunger. The square baler furthermore comprises an electronic device for determining a value representative of or an estimate of the load on one or more elements of a drive system of a baler for harvested crop. The electronic device comprises a first port for obtaining, e.g. receiving, a first value representative of or an estimate of the load on the plunger; a second port for obtaining, e.g. receiving, a second value representative of or an estimate of the position of one or more elements of the drive system, relative to load on the plunger; and a computation unit for determining the value representative of or the estimate of the load on one or more elements of the drive system based on the first and second value. In determining the value representative of or the estimate of the load on one or more elements of the drive system, the first and second value may be combined, for example by mathematical combination such as multiplication. The electronic device according to embodiments of the present invention may furthermore comprise a third port for outputting the determined load value.

It is advantageous to use an electronic device according to embodiments of the present invention, as it takes into account not only the load on the plunger, but also the position, for example angular position, of elements of the drive system. It has been found by the inventors that, independent of the load on the plunger, the load on the elements of the drive system may vary, and this dependent on the position of the elements of the drive system. In a safety system in accordance with embodiments of the present invention, based on an electronic device according to embodiments of the present invention, this variation is taken into account.

In embodiments of the present invention, the one or more elements of the drive system may be any of a crank connected to the plunger, a flywheel shear bolt, or a related gearbox.

An electronic device according to embodiments of the present invention may further comprise a plurality of position sensors, placed on the drive system, for determining the second value representative of or an estimate of the position of one or more of the elements of the drive system.

In an alternative embodiment, the electronic device further comprises a position sensor, placed on the drive system for determining a reference position of one or more of the elements of the drive system, and a velocity sensor for measuring velocity of one or more elements of the drive system. Signals from the position sensor and from the velocity sensor together provide the second value representative of or an estimate of the position of one or more of the elements of the drive system. This embodiment can be combined with the previous embodiment on an element per element basis, in that one may select between one of these embodiments the one most suited one.

In a further embodiment, a display is provided for displaying the value representative of or an estimate of the load on one or more elements of a drive system to the baler operator. Such display may aid an operator of the baler to get maximum productivity with his machine, without going over the limits and destroying or fastly ageing components thereof. Such display may be, but does not need to be, provided in a tractor towing the baler.

In a still further embodiments, a control signal generating unit is provided for determining a control signal for controlling the load on one or more elements of a drive system. The control signal generating unit may comprise a storage means for storing a reference maximum load on one or more elements of the drive system. It can also comprise a computation unit for determining a control signal based on the value representative of or estimate of the load on the one or more elements of the drive system by use of a comparator for comparing the value representative of or estimate of the load on the one or more elements of the drive system with the stored reference maximum load on the one or more elements of the drive system.

In further embodiments, the computation unit may comprise a means for receiving operator input, to take into account received baler operator input. This way, control of controllable elements of the baler may take into account baler operator input.

The electronic device according to embodiments of the first aspect of the present invention may be operatively connected to at least one controllable element of the baler and an actuator, operatively connected to the controllable element for steering in accordance with the generated control signal.

In a second aspect, the present invention provides a method for determining a value representative of or an estimate of the load on one or more elements of a drive system, the one or more elements of the drive system being for driving a plunger of a baler for harvested crop. The method comprises the steps of obtaining, e.g. receiving, a first value representative of or an estimate of the load on the plunger; obtaining, e.g. receiving, a second value representative of or an estimate of the position of one or more elements of the drive system, relative to the load on the plunger; and combining the first and second value to thereby determine a value representative of or an estimate of the load on one or more elements of a drive system.

In embodiments of this aspect of the invention the one or more elements can for example be a crank connected to the plunger, a flywheel shear bolt, or a related gearbox.

In embodiments of the second aspect of the present invention, combining may comprise multiplying the first and goniometric transform (like sin(x) or cos(x)) of the second value, whereby the value representative of or an estimate of the load on one or more elements of a drive system is related to the torque applied to one or more of those elements.

In embodiments of this aspect of the present invention, the position of the one or more elements may be determined from signals received from a plurality of position sensors, placed on the drive system to enable position determination. In alternative embodiments, the position of the one or more elements may be determined from a signal received from a reference position sensor, placed on the drive system to enable position determination, in combination with a velocity sensor for measuring velocity of one or more elements of the drive system. This embodiment can be combined with the previous embodiment in that for each of the drive elements considered the most suited approach may be selected.

In a third aspect, the present invention provides a method for enabling monitoring of baler operations by a baler operator. The method comprises method steps as in any of the method embodiments of the second aspect, with a step of displaying the value representative of or an estimate of the load on one or more elements of a drive system.

In a fourth aspect of the invention, a method is presented for use in controlling the load on one or more elements of a drive system for driving the plunger of a baler for harvested crop. The method comprises the step of obtaining, e.g. receiving, a value representative of or an estimate of the load on one or more elements of a drive system determined in accordance with embodiments of the second aspect of the invention. The method also comprises the steps of determining a control signal for controlling the load on one or more elements of the drive system based on the obtained value representative of or estimate of the load on one or more elements of the drive system.

Embodiments of the fourth aspect may further comprise obtaining, e.g. receiving, baler operator input, wherein the step of determining the control signal takes into account the obtained baler operator input.

A method according to embodiments of the present invention may further be adapted for controlling the load on one or more elements of the drive system by means of at least one controllable element, steerable by an actuator. The method then further comprises applying the control signal to the actuator of the controllable element.

It is an advantage of embodiments of the present invention that methods and systems are provided which may be used in balers for harvesting crop, more in particular methods and systems for determining the load on one or more elements of the drive system of the plunger. Such methods and systems may be used for controlling such balers. The methods and systems provided according to embodiments of the present invention are simple, cheap and robust.

Particular and preferred aspects of the invention are set out in the accompanying independent and dependent claims. Features from the dependent claims may be combined with features of the independent claims and with features of other dependent claims as appropriate and not merely as explicitly set out in the claims.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

Figure 1:
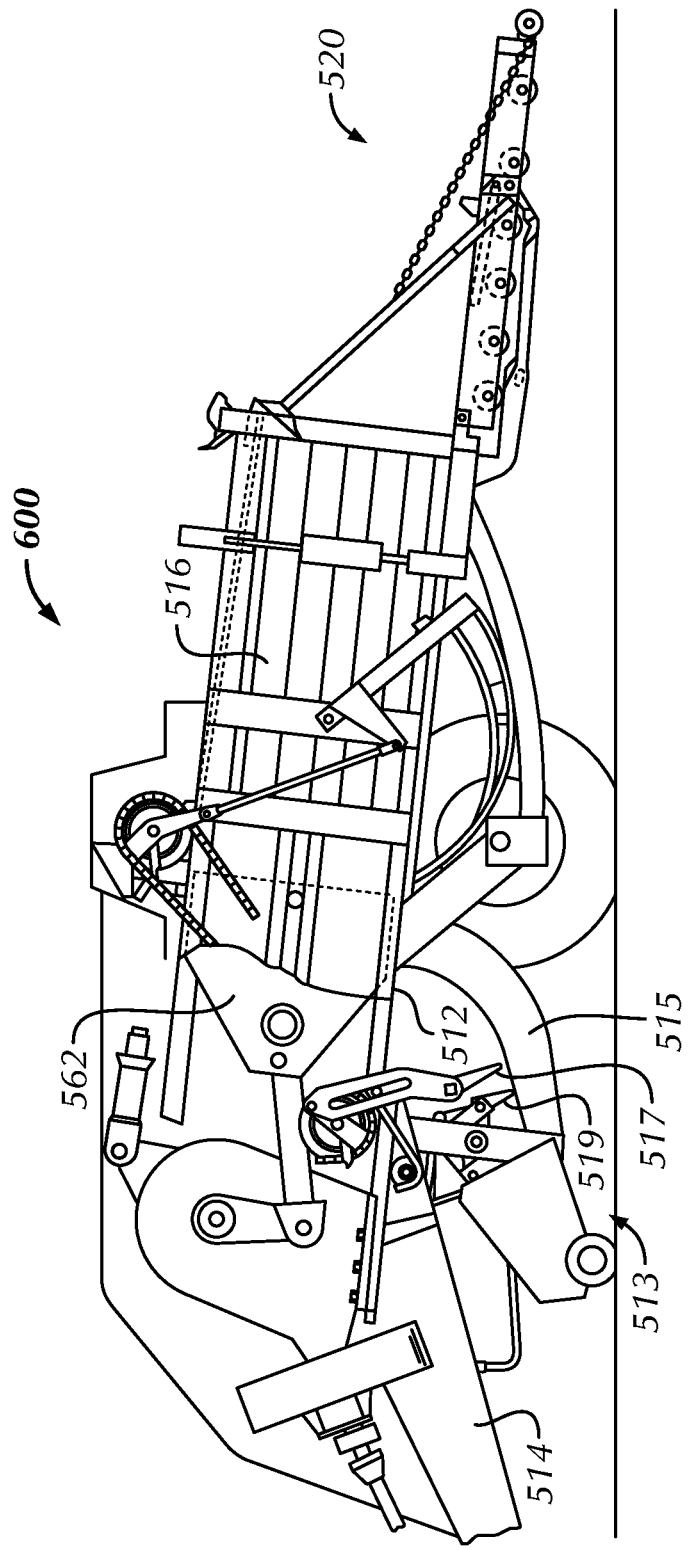
FIG. 1 shows a general outline of a baler.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the invention.

Any reference signs in the claims shall not be construed as limiting the scope.

In the different drawings, the same reference signs refer to the same or analogous elements.

DETAILED DESCRIPTION OF THE INVENTION

The present invention will be described with respect to particular embodiments and with reference to certain drawings but the invention is not limited thereto but only by the claims.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In state of the art balers, an operator can only see the conrod (coupling drive system and plunger) forces. This has the disadvantage that it does not give an indication in terms of torques and powers which would indicate to him the general performance of the machine. Because of this, the operator will have to experience where the limits for his machine are in the specific conditions encountered (type of crop harvested, degree of moisture, . . . ). To remain on the safe side, an operator will apply a safety margin on his experiences, which reduces the performance of the baler. All this results in annoying shearing of the shear bolt and/or a sub-optimally working machine when conditions slightly change. In state of the art balers, a density regulation system determines the density of a bale by means of the force applied to the plunger compressing the bale. This may be done by a load cell on the plunger, on the pin of the conrod, or on the gearbox. This prevents overloading of the conrods, plunger and baler structure. However, for the main drive gearbox it is more important to be protected against too high output torques. The current density regulation system cannot do this, hence the output torque may become too high when the baler is working at high capacities. This results in reduced lifetime of the baler main drive gearbox and shearing of the flywheel shear bolt and discontinued operation. In state of the art balers the baler density regulation system measures the forces on the box and controls the pressure in the bale chamber pistons. This prevents overloading of the conrods, plunger and baler structure, but nothing is done to limit the crankshaft output torque.

The present invention provides methods and systems for use in balers for harvesting crop, more in particular methods and systems for determining the load on one or more elements of the drive system of the plunger. The present invention further provides use of such methods and systems for controlling such balers. The methods and systems according to embodiments of the present invention are simple, cheap and robust, and avoid break-down or rapid ageing, despite the baler being operated for high density baling and hence with large loads on one or more elements of the baler, in particularly one or more elements of the plunger drive system, such as the crank and/or the flywheel (and the flywheel shear bolts) and/or the related gear box.

The present invention provides methods and systems for determining such loads in an indirect way, hence not by measuring those loads per se with a sensor on the element under consideration, but by using data measured at other locations in the baler, in particular data about the load on the plunger (which might in itself also be determined indirectly). It is impossible to carry out reliable direct torque measurements in a baler. Further, the indirect method takes into account the dynamics of the operation. Indeed, the forces in those one or more elements under consideration are time-varying and depend on the relative position of the crank with respect to the plunger. So instead of using the worst case condition (e.g. the maximum allowable load on the plunger) to inform the operator about machine conditions and/or invoking control systems, a more realistic load estimate is used, by taking into account those position.

The present invention therefore provides a realistic view on the operating conditions for the operator who can then adapt his operations (if he wishes to do so), while further control systems can take preventive actions if pre-determined thresholds are achieved. Instead of using a conservative approach based on maximum allowable plunger loads, it is proposed in accordance with embodiments of the present invention to use a fairly accurate estimate of the actually occurring loads—by computing the torque on the crank—hence by projecting and splitting the load of the plunger under the right angle in its various components—say orthogonal and tangential to the crank—by using some goniometric transform of the position information of the crank.

The invention builds on the insight that the maximum load condition of the plunger load is not a good representative value per se, but needs to be combined with the real working conditions—here reflected in crank position relative to the plunger. Depending on the angular position of the crank, for a same force on the plunger, a different torque applies to the drive system. Further, the invention builds on the insight that providing such load information to an operator and/or using such load information in control systems, will result in average operating at higher loads (as one does not have to apply large safety margins) while still guaranteeing proper operation because the real loads are taken into account. Further, the invention acknowledges the easy integration of this additional source of information (with or without further feedback of the operator acting upon, for instance, displayed information) in baler control systems, so the advantage of having high load operating conditions in a safe way, comes at a marginal cost.

FIG. 1 shows a general outline of a baler 600 with a bale-forming chamber 516 and a plunger 562, for which the invented methods and systems are suited. The baler of FIG. 1 does not show particular details corresponding to embodiments of the present invention, hence the baler is labeled "prior art". However, a similar baler provided with devices or systems according to embodiments of the present invention would not be prior art.

Figure 2:
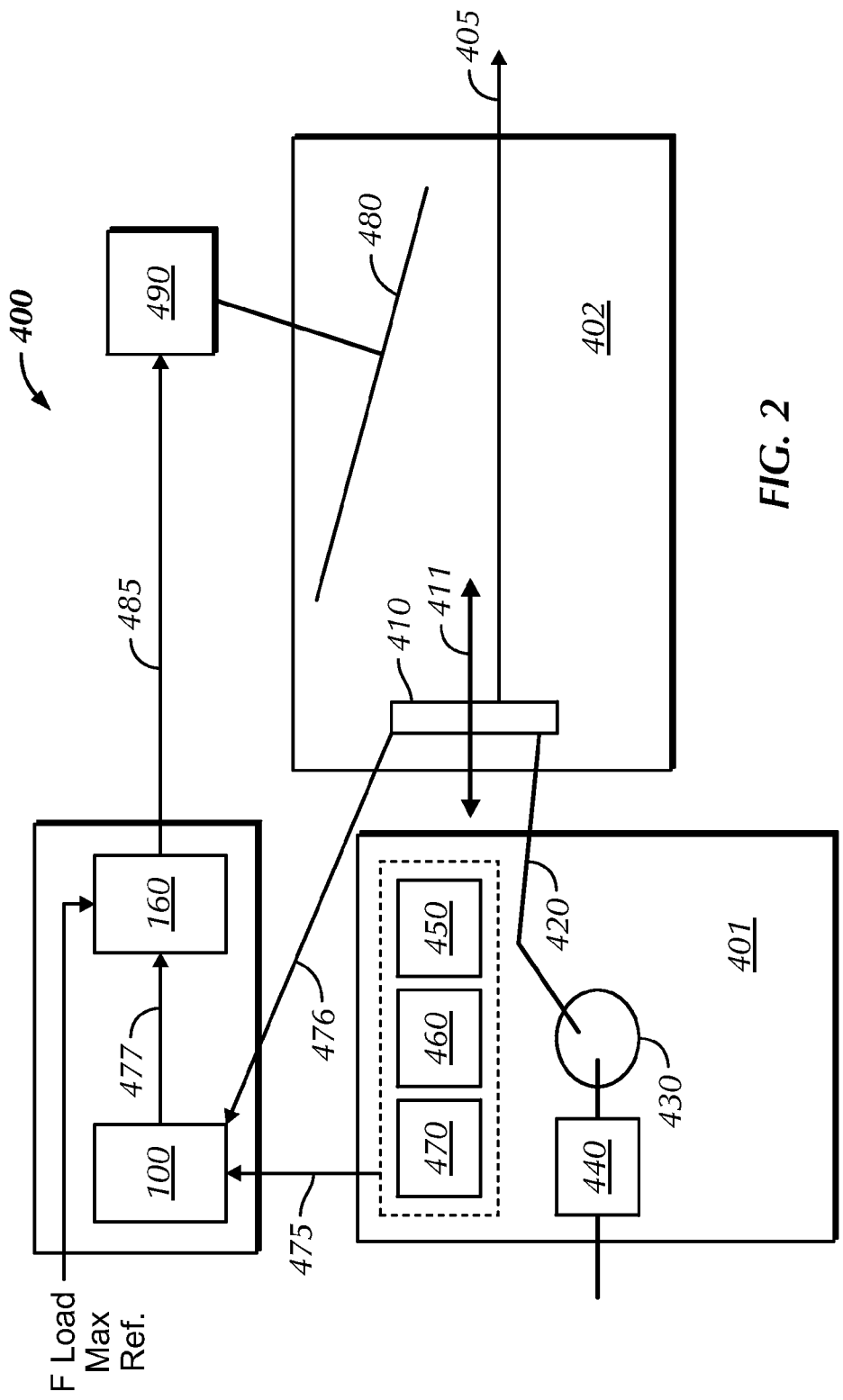
FIG. 2 shows a schematic view of an entire bale system according to embodiments of the present invention.

FIG. 2 shows a schematic view of a bale system according to embodiments of the present invention, illustrating a baler 400 with its internal bale-forming chamber 402, a plunger 410 adapted for performing a reciprocating movement 411 in the bale-forming chamber 402, thus forming a bale and moving it toward the rear of the baler 400 in the crop and bale movement direction 405, and a plunger drive system 401 for actuating the plunger 410. FIG. 2 further shows a system or electronic device 100 according to embodiments of the present invention, for determining a value representative of or an estimation of the load on one or more elements of the drive system 401, connectable to a control signal generating unit 160 for determining at least one control signal 485 for at least one controllable element 480 of the baler 400, for example a movable wall of the bale-forming chamber 402, and its actuator 490. The actuator 490 may actuate the controllable element 480 so as to perform a suitable action, e.g. in case of a movable wall take on a suitable position, dependent on the control signal 485.

As an example, a possible realization of the plunger drive system 401 is illustrated in FIG. 2. The plunger drive system 401 comprises a gearbox 440 driven by a main gearbox (not illustrated) of the baler 400. The gearbox 440 drives a flywheel 430, which in turn drives a crank 420 for actuation of the plunger 410 in reciprocating movement. Hence in the plunger drive system 401, a rotating movement of the gear box 440 is converted into a linear movement for driving the plunger 410. Typically flywheel shear bolts are provided between the crank 420 driving the plunger and the flywheel driving the crank. If forces on the flywheel exceed a predetermined limit, the flywheel shear bolts will break, thus inducing down time of the baler 400.

In accordance with embodiments of the present invention, first means (not illustrated), for example sensors, may be provided for providing a first value 476 representative of an estimate of the load on the plunger, and second means, for example sensors 450, 460, 470, may be provided for providing a second value 475 representative of or an estimate of the position of one or more elements of the plunger drive system 401. Both first and second values 475, 476 are combined to determine a value 477 representative of or an estimate of the load on one or more elements of the drive system 401. This combination may be made in the electronic device 100.

Two different embodiments of means for providing position information of one or more elements of the plunger drive system 401 are shown in FIG. 2. A first embodiment comprises one or more position sensors 450 for determining, e.g. measuring, the position of the crank 420. Alternatively or on top thereof, according to a second embodiment, a sensor 470 for measuring the speed of the flywheel 430, in combination with a reference position sensor or detector 460 may be provided. In any of the above embodiments, position indication signals 475 of one or more elements of the drive system 401 are provided.

It is to be noted that embodiments of the present invention focus on determining such drive element load information 477 which can subsequently either be used by the operator (e.g. via a display) who can for example change his operations—reducing speed, changing baler settings, or which can alternatively be used by a control system for protecting the elements of the drive system from breakage. In particular embodiments, a combination of use of the drive element load information by the operator and use thereof by a control system may also be implemented. Furthermore, input from the operator may also be applied to the control system. Further the invention highlights the importance of using relative position information—in essence the angle of the crank 420 with respect to the plunger 410.

The value 477 representative of or the estimate of the load on one or more elements of the plunger drive system 401 may be applied to a control signal generating unit 160 for generating a control signal 485 for being applied to an actuator 490 for actuating at least one controllable element 480 of the bale-forming chamber 402.

Figure 5:
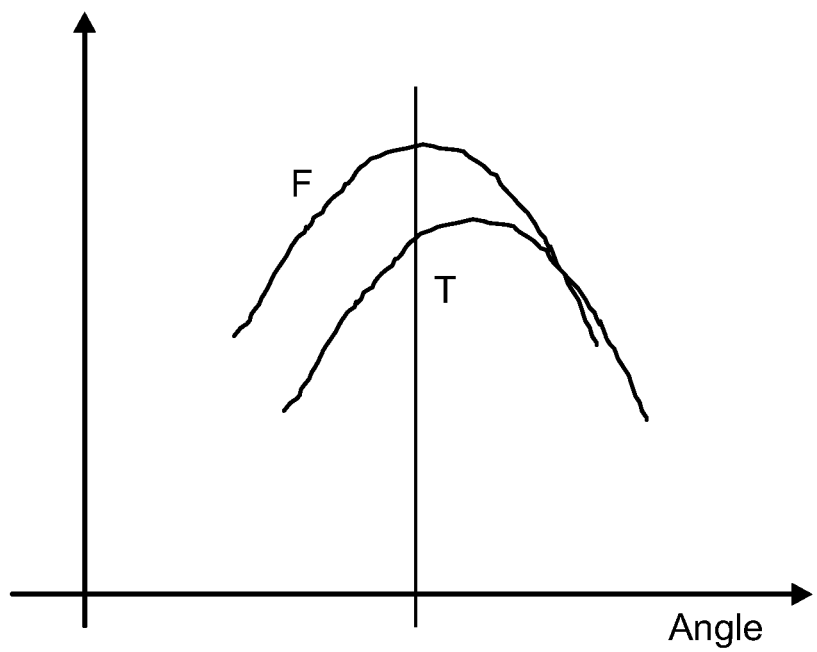
FIG. 5 shows plunger load and the crank torque as function of crank angle for a first condition.
Figure 6:
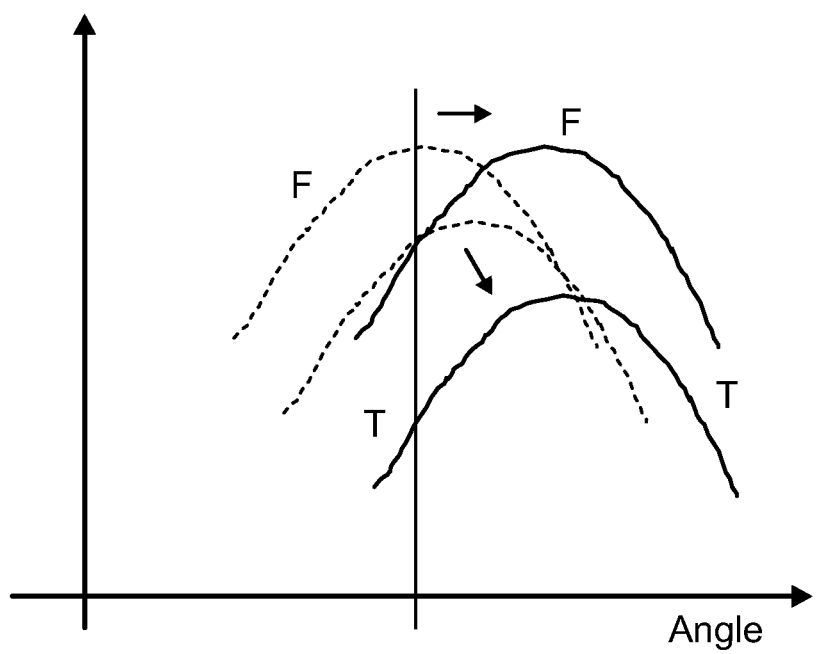
FIG. 6 shows plunger load and the crank torque as function of crank angle for a second condition.

FIG. 5 and FIG. 6 show the load F on the plunger 410 and the torque T on the crank 420 as a function of crank angle for a first and second operating condition, respectively. FIG. 6 shows the load and the torque displacement compared with FIG. 5 as indicated in dashed lines. One can observe from these drawings, in particular from FIG. 6, that while the maximum load on the plunger remains more or less the same for different crank angles, the maximum torque reached is different in amplitude (strength) when comparing both operating conditions. The operating conditions are different in that the maximum torque is obtained when the relative position of the crank versus the plunger, represented by the crank shaft angle, is different.

As indicated above, the position information 475 of one or more elements of the plunger drive system 401 can be determined in various ways. It is also worth noting that the sensors 450, 460, 470 for determining a value representative of or an estimate of the position of one or more elements of the drive system 401 are not necessarily present in a way that the entire movement of the crank 420 can be monitored. Indeed, when including design and operation knowledge in an optimal sensor position placement, one may select to place the sensors in the neighborhood of those positions where a maximum torque can be expected. In this way one may reduce the costs of installing position sensors and/or increase the level of detail by placing most sensors around those critical positions such that a more detailed sampling of position data is possible there.

Figure 3:
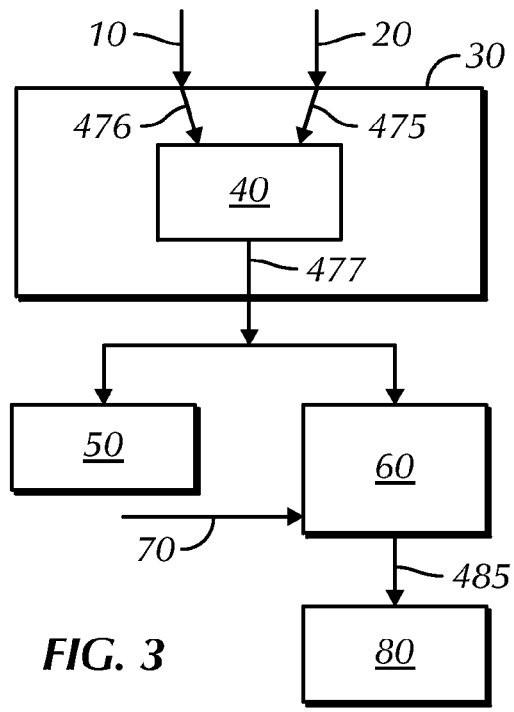
FIG. 3 shows a flow chart of methods according to embodiments of the present invention.

FIG. 3 shows a flow chart of a method embodiment of the present invention with a step of receiving 10 a first value 476 representative of or an estimate of the load on the plunger 410; receiving 20 a second value 475 representative of or an estimate of the position of one or more elements of the drive system 401, relative to the load on the plunger 410; and combining 30 (e.g. by multiplying 40) the first and second values 475, 476 to determine a value 477 representative of or an estimate of the load on one or more elements of a drive system 401 with optionally displaying 50 the outcome, being the value representative of the drive elements load and/or determining 60 a control signal 485 (without or with taking into account input received 70 from an operator) to be applied 80 to at least one controllable element 480 of the baler 400 via an actuator 490. It is to be noted that the value 476 received, which is related to the plunger load, can be a directly measured value (load measurement) or can also be an estimate determined from other types of measurements. Also for the signal 475 representing position information of one or more elements of the drive system 401 one may use a computed or estimated value. As an example, when using a value from a reference position sensor combined with a velocity value, the position of the crank 420 will be determined by combining this information. As an example only, without limiting the present invention, about 8 crankposition sensors can be used, placed each at about 5° difference from one another, between 15° and 55° before the position where maximum plunger load is reached. Alternatively, a flywheel rpm sensor on about 6 points with a maximum plunger load position sensor on the crankshaft 420 can be used.

Figure 4:
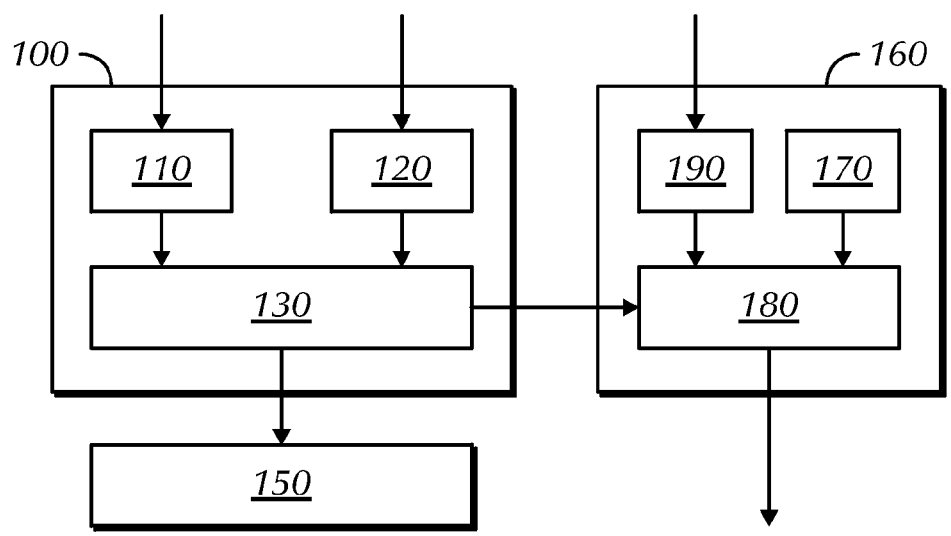
FIG. 4 shows a system or electronic device used in embodiments of the present invention.

FIG. 4 shows a system or electronic device 100 according to embodiments of the present invention, for determining a value 477 representative of or an estimate of the load on one or more elements of the drive system 401, and a control signal generating unit 160 for determining at least one control signal 485. The device 100 has a first port 110 for obtaining 10, e.g. receiving, a first value 476 representative of or an estimate of the load on the plunger 410; a second port 120 for obtaining 20, e.g. receiving, a second value 475 representative of or an estimate of the position of one or more elements of that drive system 401, relative to the load on the plunger 410; and a computation unit 130 for combining the first and second values 475, 476 to determine a value 477 representative of or an estimate of the load on one or more elements of a drive system 401. An optional display means 150 for displaying the outcome, being the value representative of the drive elements load, connected to the electronic device 100, is also illustrated.

Figure 7:
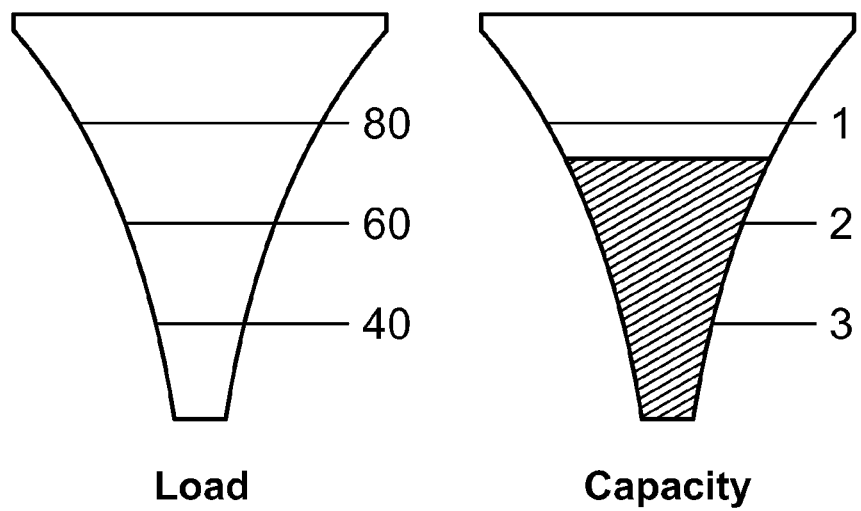
FIG. 7 illustrates an example visual display visualizing a load value obtained according to embodiments of the present invention.

FIG. 7 shows one embodiment of a possible visualization of parameters on the display means 150. In the embodiment illustrated, the load on one or more elements of the drive system is illustrated, as determined in accordance with embodiments of the present invention, as well as the capacity of the baler. If a predetermined load value is exceeded, this may be illustrated on the display means 150, so that the operator gets a visible indication that he should take an appropriate action to reduce the load on the elements of the drive system. Alternatively or on top thereof, also an auditive signal could be generated. In alternative embodiments, this auditive signal could only be generated as from the moment a predetermined threshold above the predetermined load value is exceeded. Alternatively or on top thereof, for example if the load on the drive elements would still increase, an electronic or mechanical safety system for protecting the drive mechanism of the plunger 410 could be actuated. For example a moveable wall of the bale-forming chamber could be opened so as to reduce the load on the plunger, or the speed of the towing vehicle could be reduced. Actuation of such electronic or mechanical safety system can be driven by a control signal 485 generated by a control signal generating unit 160 based on the load value 477 of the one or more elements of the drive system 401.

In particular embodiments, the control signal generating unit 160 has a storage unit 170 for storing one or more reference maximum load values on one or more elements of the drive system 401, and a computation unit 180 (e.g. a comparator) for determining the control signal 485. Optionally, the control signal generating unit 160 may have an input means 190 for receiving operator input.

It is to be noted that the provided method and system can be entirely integrated with state of the art methods of operating and control of balers. In an embodiment of such integration, at low cranktorques (or low capacities) the density regulation reacts on the conrod/plunger force to prevent overload of the conrods, plunger and baler structure. The regulation works by reducing the pressure in the bale chamber pistons while during operation the operator can see a curve on his monitor that is based on the cranktorque (which is a combination of density & capacity). This curve tells him the relationship between the actual capacity (in combination with the actual density) and the maximum capacity (for the actual density). The safety means according to embodiments of the present invention comes into place when, for some reason, the cranktorque becomes too high (close to flywheel shearbolt limit). First the operator gets an alert signal to tell him that he is at the limit of the capacity (for the current density setting). If the operator does not respond to this signal the baler will reduce the pressure in the bale chamber to protect the main drive gearbox from the too high torque.

As the above methods according to embodiments of the present invention, when used for on-line control, are executed in real-time, those methods may be executed by electronic devices or systems, which might be specifically designed for that purpose or which may be general-purpose electronic devices in combination with instructions for carrying out the methods as described. Typical operations that such devices may support are data sampling, low pass filtering, standard data operations like addition, subtracting and multiplication, comparing and other mathematical functions like computing a goniometric transform of some signals. Further storage of values e.g. threshold values to compare is supported. The electronic devices, sensors and actuators are all operatively connected, be it wired or wireless. The actuators can be hydraulic, pneumatic or electronic.

As a conclusion, embodiments of the present invention provide as such for baler performance indicators for use either in automated, in semi-automated or in entirely operator driven mode. Embodiments of the present invention may be used in optimizing the general performance of balers, and/or in protection of the components thereof. Embodiments of the present invention provide an on crank-torque or equivalent baler performance monitoring and subsequent density regulation system that optimizes the overall capacity, prevents maindrive gearbox overload and prevents unnecessary shearing of flywheel shearbolts. Embodiments of the present invention rely on conrod or plunger force signals (either measured or determined otherwise) combined with position information to calculate the actual working torque of the crankshaft of the baler.

The invention claimed is:

1. A square baler that forms rectangular bales of agricultural crop material, comprising
a plunger that compacts harvested crop material by a reciprocating movement in a fore-and-aft direction within a bale-forming chamber,
a drive system that drives the reciprocating movement of the plunger, a plurality of sensors placed on the drive system, and
an electronic device that determines a value representative of an estimate of the load on one or more elements of the drive system, the electronic device comprising
a first port for obtaining a first value representative of an estimate of the load on the plunger;
a second port for obtaining a second value representative of an estimate of the position of one or more elements of the drive system, relative to load on the plunger; and
a computation unit that determines the value representative of the estimate of the load on one or more elements of the drive system based on the first and second value.

2. The square baler of claim 1, wherein the elements of the drive system are one or more elements selected from the group of a crank connected to the plunger, a flywheel shear bolt or a gearbox.

3. The square bale of claim 1, wherein the plurality of sensors comprises a plurality of position sensors placed on the drive system to determine the second value representative of an estimate of the position of one or more of the elements of the drive system.

4. The square baler of claim 1, wherein the plurality of sensors comprises a position sensor, placed on the drive system to determine a reference position of one or more of the elements of the drive system and a velocity sensor that measures velocity of one or more elements of the drive system, signals from the position sensor and the velocity sensor together providing the second value representative of an estimate of the position of one or more of the elements of the drive system.

5. The square baler of claim 1, further comprising a display that displays the value representative of an estimate of the load on one or more elements of a drive system to a baler operator.

6. The square baler of claim 1, further comprising a control signal generating unit that determines a control signal for controlling the load on one or more elements of the drive system, the control signal generating unit comprising a storage unit for storing a reference maximum load on one or more elements of the drive system and a computation unit for determining a control signal based on the value representative of or estimate of the load on the one or more elements of the drive system by use of a comparator that compares the value representative of or estimate of the load on the one or more elements of the drive system with the stored reference maximum load on the one or more elements of the drive system.

7. A method that determines a value representative of an estimate of the load on one or more elements of a drive system, a plurality of sensors placed on the drive system, the one or more elements of the drive system represents driving a plunger of a baler for harvested crop, the method comprising
obtaining a first value representative of an estimate of the load on the plunger;
obtaining a second value representative of an estimate of the position of one or more elements of the drive system, relative to the load on the plunger; and combining the first and second value to thereby determine a value representative of an estimate of the load on one or more elements of a drive system.

8. The method of claim 7, wherein determining a value representative of an estimate of the load on one or more elements of a drive system, comprises determining a value representative of an estimate of the load on one or more element selected from the group of a crank connected to the plunger, a flywheel shear bolt or a gearbox.

9. The method of claim 7, wherein the combining comprises multiplying the first value and a goniometric transform of the second value, whereby the value representative of an estimate of the load on one or more elements of a drive system is related to the torque applied to one or more of those elements.

10. The method of claim 7, wherein the second value representative of an estimate of the position of the one or more elements is determined from signals obtained from a plurality of position sensors, placed on the drive system so as to enable position determination.

11. The method of claim 7, wherein the second value representative of an estimate of the position of one or more elements is determined from a signal obtained from a reference position sensor, placed on the drive system so as to enable position determination, in combination with a signal obtained from a velocity sensor for measuring velocity of one or more elements of the drive system.

12. A method of enabling monitoring of baler operations by a baler operator, the method comprising the method steps of claim 7; and displaying the value representative of an estimate of the load on one or more elements of a drive system.

13. A method of controlling a load on one or more elements of a drive system for driving a plunger of a baler for harvested crop, a plurality of sensors placed on the drive system, the method comprising:
obtaining a value representative of an estimate of the load on one or more elements of the drive system
by:
obtaining a first value representative of an estimate of the load on the plunger;
obtaining a second value representative of an estimate of the position of one or more elements of the drive system, relative to the load on the plunger; and combining the first and second value to thereby determine a value representative of an estimate of the load on one or more elements of a drive system;
and determining a control signal for controlling the load on one or more elements of the drive system based on the obtained value representative of estimate of the load on one or more elements of the drive system.

14. The method of claim 13, further comprising obtaining baler operator input, wherein the step of determining the control signal takes into account the obtained baler operator input.

15. The method of claim 13, further comprising
controlling the load on one or more elements of the drive system by at least one controllable element steerable by an actuator, and
applying the control signal to the actuator of the controllable element.

* * * * *